Nov. 21, 1967 R. H. EASTOP 3,354,322

TURN-OFF ARRANGEMENT FOR A DIRECT CURRENT SWITCHING DEVICE WHICH IS RENDERED NON-CONDUCTING BY THE APPLICATION OF A REVERSE VOLTAGE

Filed June 30, 1964 2 Sheets-Sheet 1

Nov. 21, 1967 R. H. EASTOP 3,354,322

TURN-OFF ARRANGEMENT FOR A DIRECT CURRENT SWITCHING DEVICE WHICH IS RENDERED NON-CONDUCTING BY THE APPLICATION OF A REVERSE VOLTAGE

Filed June 30, 1964 2 Sheets-Sheet 2

United States Patent Office 3,354,322
Patented Nov. 21, 1967

3,354,322
TURN-OFF ARRANGEMENT FOR A DIRECT CURRENT SWITCHING DEVICE WHICH IS RENDERED NON-CONDUCTING BY THE APPLICATION OF A REVERSE VOLTAGE

Robert H. Eastop, London, England, assignor to Westinghouse Brake and Signal Company, Limited, London, England Filed June 30, 1964, Ser. No. 379,319
Claims priority, application Great Britain, July 8, 1963, 26,902/63
7 Claims. (Cl. 307—88.5)

ABSTRACT OF THE DISCLOSURE

A turn-off arrangement for a direct current switching device, especially one employing semi-conductor controllable rectifiers, connected in a path between a supply source and a load. The SCR is rendered non-conducting by the application, thru a second SCR, of a reverse voltage from a storage capacitor, the capacitor being recharged from an inductance, connected with a transistor in parallel across the first path, upon the transistor being switched off.

This invention relates to turn-off arrangements for direct current switching circuits and relates especially but not exclusively to turn-off arrangements for switching circuits employing semi-conductor controllable rectifier devices as the switching devices.

According to the present invention there is provided a direct current switching circuit arrangement including a first switching device in a supply path from a supply source to a load terminal and which can be rendered conducting on application of a switching signal thereto and can be rendered non-conducting by the application of a reverse voltage thereto from a storage capacitor through a second switching device and wherein an inductance is provided connectable in a supply path apart from that of the first switching device but parallel thereto, and a third switching device for connecting said inductance in a path across said supply source, such that said storage capacitor is chargeable by current from said inductance which continues to flow in said conductance on switching off the third switching device.

Figure 1:
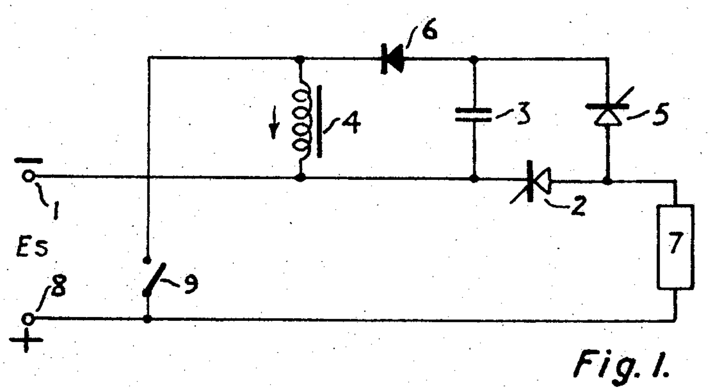

In order that the present invention may be clearly understood and readily carried into effect the same will be further described by way of example only with reference to the accompanying drawings of which:

FIGURE 1 is a diagrammatical circuit illustration of the basic principle of the invention and FIGURES 2, 3, 4 and 5 illustrate various embodiments of the invention. Referring to FIGURE 1, a direct current supply source providing a voltage $Es$ is connected with the polarity indicated to input terminals 1 and 8 of the circuit, the terminal 1 being connected via a switching device 2 to one terminal of a load 7. The other terminal of the load 7 is connected directly to the other input 8. A further switching device 5 is provided in a path including a storage capacitor 3 such that when 5 is rendered conducting the storage capacitor is connected directly across the switching device 2. Further, an inductance 4 has one terminal connected to the supply terminal 1 and the other terminal connected via a unilaterally conductive device 6 to the junction of 3 and 5. The last mentioned terminal of 4 is also connected via a switching means 9 to the input terminal 8 to the circuit.

In operation of the circuit arrangement shown in FIGURE 1, it may be understood that the switching device 2 and the switching device 5 are each semi-conductor controllable rectifier devices of the type which are rendered conducting on application of a triggering signal thereto and are subsequently only rendered non-conducting when the current therein has fallen to zero for a predetermined period of time. Assuming moreover that the device 2 is conducting, a current flows through the source terminals 1 and 8 and the load 7. When it is desired to render 2 non-conducting to interrupt the current to the load, a triggering signal is applied to the controllable rectifier device 5 and if the capacitor 3 has acquired a sufficiently large charge of the correct polarity, the voltage across 2 is reversed for a sufficient period to render 2 non-conducting. Since at this point there is a tendency for 5 to continue in its conducting condition owing to the presence of a direct current path from the input terminal 8 via 7, 5, 6 and 4 to the other terminal 1, it is necessary that 5 be turned off before 2 is again rendered conducting. Therefore the switching means 9 is provided between the upper terminal of 4 and the source terminal 8 and this switching means is rendered conducting when 5 is rendered conducting. Thus for the period when 5 is conducting, the unilaterally conductive device 6 is reverse biased and therefore 5 becomes non-conducting as soon as the charge on 3 has been dissipated through 5 and 7. While it is generally convenient to render 9 conducting at the same instant as 5, it is not essential that these events be simultaneous.

The switching device 9 in conjunction with the inductance 4 have an additional and essential effect in that they provide for recharging of the capacitor 3. Thus when 9 is rendered conducting current begins to build up in linear manner through the inductance 4 through switch 9 and 9 is subsequently rendered non-conducting as soon as is convenient after 5 has been rendered non-conducting. The interruption of current in the circuit including 9 to the inductance 4 causes the stored energy in 4 to be transferred via the diode 6 to the capacitor 3. The charge on the capacitor is therefore now substantially as was assumed to originally exist and the magnitude of this charge is dependent upon the instantaneous current in 4 at the moment when current is interrupted by 9.

Various embodiments or variants on the basic circuit arrangement shown in FIG. 1 will become apparent to those skilled in the art and a small number of these are illustrated herein.

Figure 2:
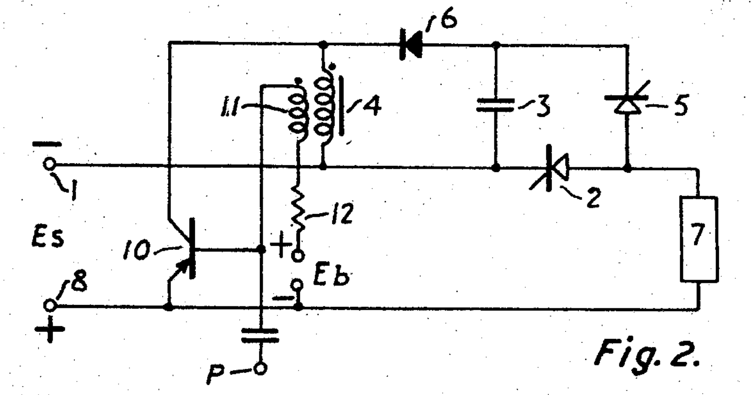

Referring to FIGURE 2, the switching means 9 of FIGURE 1 is constituted by a transistor 10. The base electrode of this transistor is connected via a capacitor to a trigger pulse terminal P and also via a secondary winding 11 mutually coupled with 4 and a resistance 12 to a bias source $Eb$ with the polarity shown. Otherwise the circuit arrangement is substantially the same as that of FIGURE 1.

In operation of the circuit arrangement of FIGURE 2, the transistor 10 is normally biassed into the non-conducting condition, by the bias potential $Eb$. On application of a negative triggering pulse at P coincident with the application of a triggering pulse to 5, 10 is rendered conducting and there is a build-up of current in the inductance 4 with a constant voltage. The constant voltage across winding 11 results in a constant base current for the transistor 10 which is maintained conducting until the point at which saturation current is reached therein. At this point the voltage across 11 begins to reduce and 10 is subsequently rendered non-conducting. The period over which feedback current to the base electrode of 10 is operative to maintain 10 conducting is chosen by selecting the circuit constants such that 10 continues to conduct until 5 has been rendered non-conducting in the manner described in relation to FIGURE 1.

Figure 3:
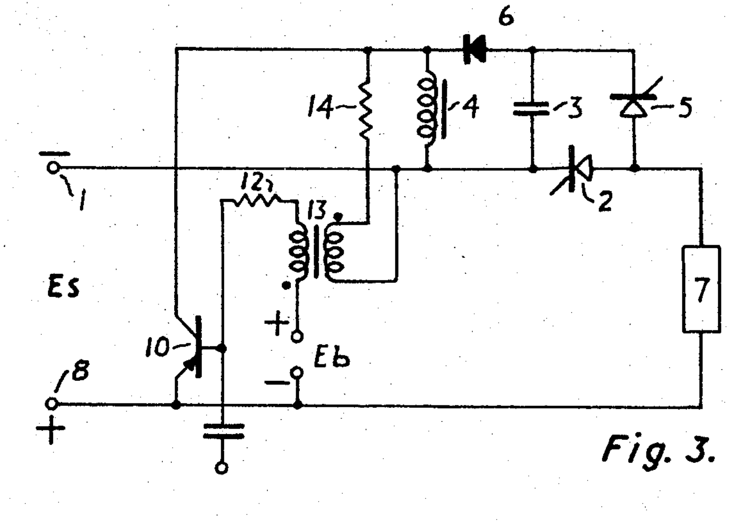

In the arrangement of FIGURE 2 it will be clear that the instant at which 10 becomes non-conducting is dependent upon the attainment of saturation current in this transistor and this disadvantage can be overcome by employing a circuit arrangement of FIGURE 3 in which instead of the saturation of transistor 10 being the determining factor, saturation of the core of a transformer 13 is the determining factor. In this arrangement the primary winding of saturable transformer 13 is connected via a resistor 14 across the terminals of choke 4 and it is arranged that 13 saturates before the transistor 10 thereby attaining an earlier turn-off for the transistor 10. A further major advantage of this arrangement is that the time taken to saturate the transformer 13, varies inversely as the supply voltage $E_s$. So, the current in 4 when 10 is turned off, can be arranged to be independent of variations of $E_s$ over a wide range.

Figure 4:
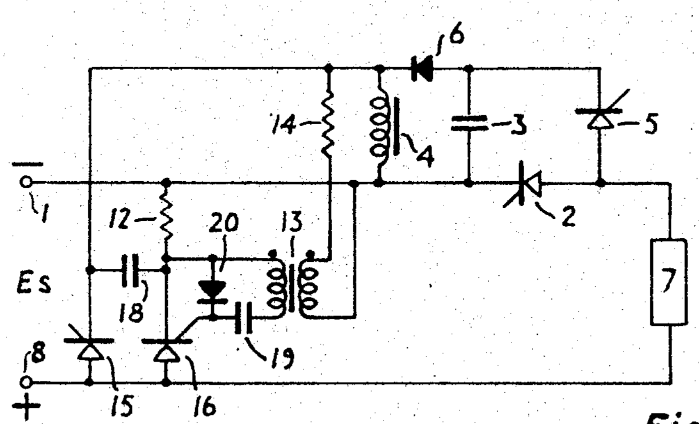

In a further embodiment of the invention, the switching device 9 of FIGURE 1 may be constituted by a further controllable rectifier device 15 as shown in FIGURE 4. In this circuit arrangement, semi-conductor controllable rectifier device 15 operates in conjunction with a further semi-conductor controllable rectifier device 16, and the "cathodes" of these rectifier devices are coupled via a capacitor 18. The secondary winding of a transformer 13, arranged in conjunction with the resistor 14 in a similar manner to that of FIGURE 3, is connected via a capacitor 19 to the triggering electrode of 16 and the "cathode" and triggering electrode of 16 are bridged via a diode 20.

In the operation of the circuit of FIGURE 4, both 15 and 16 are normally non-conducting. The device 15 may be rendered conducting by a triggering pulse at the same instant as the device 5 as described earlier. While 15 is conducting a voltage appears across the windings of 13, and condenser 19 is charged with the plate adjacent to 16 positive relative to the other plate. Simultaneously, there is a linear build-up of current in 4, and the condenser 18 is charged with a voltage appropriate to extinguish 15 when required. When the core of 13 saturates, secondary winding of 13 presents a very low impedance and the voltage across it falls to zero, and 16 is triggered into the conducting state by the charge on 19. Device 15 is extinguished by firing 16 by virtue of the accumulated charge on 18 being applied to the latter, and the energy in 4 is transferred to 3. When the transfer of energy from 4 to 3 is complete, there is a collapse of voltage across 4 which is applied to 16 through 18, and 16 is extinguished also.

The design of a direct current switching arrangement in accordance with the invention is essentially a compromise between a number of factors. A better compromise may be made by employing a tapping on the choke 4. For example, in the circuit arrangement of FIGURE 2, the collector electrode of the transistor 10 which constitutes the switching means 9, may be connected to a low tapping point on the choke 4 rather than as shown in FIGURE 2 to the end terminal. This modification increases the peak current of the transistor but reduces the peak collector to emitter voltage. This arrangement also increases the reverse voltage on the rectifier device 6 during the turn-off period of the controllable rectifier 2 and ensures that the controllable rectifier 5 is rendered non-conducting. In this connection, it will be appreciated that in the basic arrangement of FIGURE 1, the reverse voltage on the rectifier device 6 falls to zero with ideal semiconductor devices but with practical non ideal devices, it is possible that small leakage currents may flow in the devices 5 and 6 and thereby sustain the conducting condition of 5.

Another proposal is to employ multiple windings on the inductance 4. Thus, in the circuit arrangement of FIGURE 2 it may be convenient when the transistor 10 is a n-p-n type transistor to provide a separate winding on the core of 4 in the transistor collector circuit. Again, as about to be described with reference to FIGURE 5, a separate secondary winding on the choke 4 is especially desirable if the arrangement is designed to run as a free-running oscillator circuit arrangement.

Figure 5:
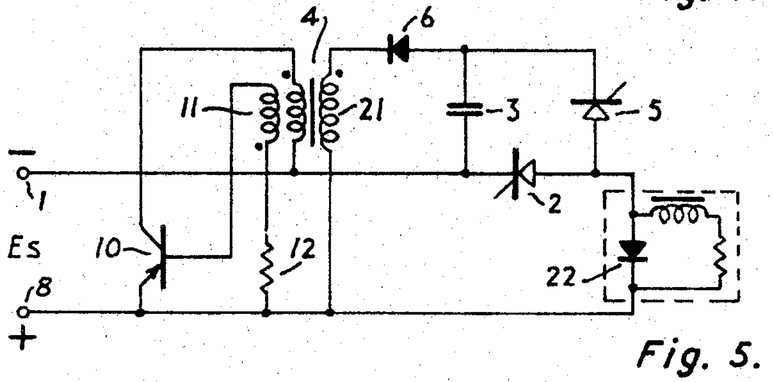

In the arrangement shown in FIGURE 5, there is no D.C. path through the device 5 and the source $E_s$ in series, and 5 may be rendered non-conducting, when 3 is discharged, independently of the state of 10. This arrangement is a modification of the arrangement shown in FIGURE 2, a separate secondary winding 21 being provided on the choke 4 having its lower terminal connected to the positive terminal 8. The transistor 10 then is included in a free-running oscillator. The hold-off bias E of FIGURE 2 is reduced to zero and the transistor and the associated components now operate as a single-transistor ringing choke converter charging the capacitor 3. With this free-running arrangement, it is necessary during the turn-off period, that 10 shall remain either ON or OFF for a sufficient period for 3 to discharge fully through 5 and for 5 to extinguish. Otherwise, it is necessary to inhibit the oscillation during the turn-off period of the devices 2 and 5. This inhibition occurs conveniently in the case where the load on the circuit is an inductance with a free-wheeling rectifier, such as 22 shown in the drawing. Thus, in operation when the controllable rectifier device 5 is rendered conducting to render 2 non-ducting, there is a virtually short circuit path across the winding 21 of the choke via the free-wheeling diode 22 and devices 5 and 6.

With other types of load arrangement, more elaborate means may be provided to inhibit oscillations temporarily during the aforementioned non-conducting period. It will be understood, however, that since the lower terminal of the secondary winding 21 is connected to the positive supply terminal 8, this ensures that when the device 2 is non-conducting and oscillation in 10 is temporarily inhibited, the steady state current through 21, 6 and 5 is zero and the device 5 may ultimately be rendered non-conducting.

In the arrangement of FIGURE 5, stored energy in the choke 4 is added to the capacitor 3 in each cycle of the oscillation and the final voltage built up on this capacitor may be only being limited in magnitude by the residual losses in the circuit. In general this is undesirable and there are many ways which are well-known to those skilled in the art for sensing the peak voltage on the capacitor 3 or on the winding 19 and comparing this with a reference voltage to produce a signal which inhibits further oscillation of the circuit when the voltage across 3 tends to exceed a predetermined desired level. Such arrangements will not be described further herein.

In an alternative to the arrangement of FIGURE 5, the feedback winding may be omitted and the switching means 10 may be operated from a separate oscillator. In this case it may be necessary to gate the drive from the oscillator in such a manner that switching ceases, leaving the switching means 10 conducting or non-conducting, for short periods after the controllable rectifier device 5 is rendered conducting. This permits the current in 5 to fall to below the sustaining level for conduction of 5, before the capacitor 3 begins to be recharged. It is also desirable in this arrangement to have a self-regulating feedback circuit to limit the maximum voltage to which the capacitor 3 may be charged as mentioned above.

Having thus described my invention what I claim is:

1. A turn-off arrangement for a direct current switching device which is incorporated in a supply path from a supply source to a load terminal, the switching device being of a kind which is rendered conducting on application of a switching signal to said device, and is rendered non-conducting by the application of a reverse voltage, said arrangement comprising a unilaterally conductive current path, a storage capacitor in said path for storing said reverse voltage, a second switching device for applying said stored reverse voltage to said switching device in said supply path, an inductance in another supply path from said supply source to said load terminal and in parallel with said unilaterally conductive current path, and a third switching device for connecting said inductance in a path across said supply source, such that said storage capacitor is chargeable by current from said inductance which continues to flow in said inductance on switching off of said third switching device.

2. A turn-off arrangement as claimed in claim 1 in which said third switching device comprises a transistor, a control circuit of said transistor coupled to a collector circuit of said transistor so that a self-oscillatory arrangement is formed.

3. A direct current switching circuit arrangement as claimed in claim 1, means being provided for rendering said third switching device non-conducting on attainment of saturation in a core of a transformer.

4. A direct current switching circuit arrangement as claimed in claim 3, the primary winding of the transformer being connected in a path in parallel with said inductance.

5. A direct current switching circuit arrangement as claimed in claim 3, said transformer incorporating said inductance.

6. A turn-off arrangement as claimed in claim 3 in which said third switching device comprises a transistor, a control circuit for said transistor which includes a secondary winding of said transformer in series with a reference source which biases the transistor to a non-conducting state, and means for initiating a conducting state of said transistor, said conducting state being maintained by feedback from said inductance.

7. A turn-off arrangement as claimed in claim 3 in which said third switching device comprises a first controllable rectifier device to render said device conducting, a further storage capacitor for reducing the current in said first controllable rectifier device to below a sustaining value to render said device non-conducting, a second controllable rectifier device for connecting said further storage capacitor across said first controllable rectifier device to render it non-conducting, and means for rendering said second controllable rectifier device conducting on attainment of said saturation in a core of said transformer.

References Cited

UNITED STATES PATENTS

| | | | |
|---|---|---|---|
| 3,146,356 | 8/1964 | Kidwell et al. | 307—88.5 |
| 3,295,048 | 12/1966 | Wouk et al. | 307—88.5 X |

OTHER REFERENCES

General Electric Controlled Rectifier Manual, 1st edition, 1960, pp. 72–73.

ARTHUR GAUSS, *Primary Examiner.*

DONALD D. FORRER, *Assistant Examiner.*